United States Patent
Gibbs

(10) Patent No.: US 7,416,457 B2
(45) Date of Patent: Aug. 26, 2008

(54) AMPHIBIOUS VEHICLE

(75) Inventor: Alan Timothy Gibbs, London (GB)

(73) Assignee: Gibbs Technologies Ltd. (GB)

( * ) Notice: Subject to any disclaimer, the term of this patent is extended or adjusted under 35 U.S.C. 154(b) by 0 days.

(21) Appl. No.: 10/333,620

(22) PCT Filed: Jul. 19, 2001

(86) PCT No.: PCT/GB01/03218

§ 371 (c)(1),
(2), (4) Date: Jun. 25, 2003

(87) PCT Pub. No.: WO02/07999

PCT Pub. Date: Jan. 31, 2002

(65) Prior Publication Data

US 2004/0014372 A1    Jan. 22, 2004

(51) Int. Cl.
B60F 3/00  (2006.01)
(52) U.S. Cl. ............... 440/12.52; 440/12.59; 440/12.66
(58) Field of Classification Search ................ 440/12.5, 440/12.51, 12.52, 12.53, 12.54, 12.57, 12.58, 440/12.59, 12.6, 12.61
See application file for complete search history.

(56) References Cited

U.S. PATENT DOCUMENTS

| 1,122,671 A | * | 12/1914 | Washington | 440/12.51 |
| 1,634,932 A | * | 7/1927 | Cook | 440/12.54 |
| 1,641,574 A | * | 9/1927 | Chavez | 440/12.52 |
| 2,878,883 A | | 3/1959 | Le Roy France et al. | |
| 3,176,585 A | * | 4/1965 | Ruf | 89/36.08 |
| 3,199,486 A | | 8/1965 | Gillois et al. | |
| 3,302,740 A | * | 2/1967 | Giacosa | 180/292 |
| 3,395,672 A | * | 8/1968 | Ruf | 440/12.6 |
| 3,613,816 A | | 10/1971 | Gutbrod | |
| 5,531,179 A | * | 7/1996 | Roycroft et al. | 440/12.5 |
| 5,562,066 A | * | 10/1996 | Gere et al. | 440/12.51 |
| 5,590,617 A | * | 1/1997 | Gere et al. | 440/12.51 |
| 5,832,862 A | * | 11/1998 | Hulten | 440/12.5 |
| 2004/0014372 A1 | * | 1/2004 | Gibbs | 440/12.59 |

FOREIGN PATENT DOCUMENTS

| JP | 63-93607 | * | 4/1988 | 440/12.5 |
| JP | 63-93608 | * | 4/1988 | 440/12.5 |
| JP | 63-93609 | * | 4/1988 | 440/12.5 |
| JP | 63 093607 | | 9/1988 | |

OTHER PUBLICATIONS

Translation of Japanese 63-93607.*
Translation of Japanese 63-93608.*
Translation of Japanese 63-93609.*
International Preliminary Examination Report dated Oct. 22, 2002.
International Search Report dated Jun. 12, 2001.

* cited by examiner

*Primary Examiner*—Sherman Basinger
(74) *Attorney, Agent, or Firm*—Calfee, Halter & Griswold LLP

(57) ABSTRACT

An amphibious vehicle (32) having a transverse mid- or rear-mounted engine (12) arranged to drive rear road wheels (30) and/or through an axial transmission (37), a marine propulsion unit (38), in which the engine (12) is so mounted in relation to the transmission (37) to the marine propulsion unit (38) that the bottom (8) of the engine is below the axis (37) of the transmission. This ensures an advantageous metacentric height which is preferably between 370 and 180 mm.

29 Claims, 9 Drawing Sheets

AMPHIBIOUS VEHICLE

CROSS REFERENCE TO RELATED APPLICATIONS

The present application is the U.S. national phase entry of PCT/GB01/03218 with an international filing date of Jul. 19, 2001 and claims priority from GB Patent Application Ser. No. 0017784.0, filed Jul. 21, 2000.

FIELD OF THE INVENTION

The present invention relates to amphibious vehicles and more particularly to amphibious vehicle having increased stability on water when planing in a marine mode.

BACKGROUND OF THE INVENTION

Practical amphibious vehicles generally have their engines mounted either centrally or in the rear of the vehicle so as to ensure a 'nose up' attitude when under way in marine mode. One such example of this conformation is as shown and described in Japan se Patent Publication No 63-093607 (Mazda Motor Corp). This Mazda proposal is for an amphibious vehicle having a transverse rear mounted engine arranged to drive selectively rear road wheels and/or, through an axial transmission, a marine propulsion unit in this case a pump jet. More particularly the engine is mounted at least partly above the rear road wheel driving axles. The pump jet is driven by a shaft from a gearbox called a "transfer device". The transfer device is so designed to power front road wheels or the pump jet as required and is itself driven from the engine via a ring gear on a differential. The transfer device is mounted ahead of the engine. The result of this Mazda conformation is that it is necessary to mount the engine above the pump jet driveshaft. This shaft is in turn central to the marine pump jet, which must be mounted to provide adequate ground clearance at the tail of the vehicle to give an adequate ramp angle when the vehicle is in road mode. Consequently the centre of gravity of the vehicle is higher than it would be for an equivalent purely marine craft. Again because it is not possible to ballast an amphibious vehicle any increase in the height of the centre of gravity relative to the centre of buoyancy is significant when considering roll in marine mode for a vehicle with a low freeboard.

It is therefore an object of the present invention to reduce the height of the centre of gravity relative to the centre of buoyancy so as to increase the stability of the amphibious vehicle commensurate with adequate ground clearance.

SUMMARY OF THE INVENTION

Accordingly the amphibious vehicle of the invention having a transverse engine mounted in the middle or rear of the vehicle, the engine arranged to drive rear road wheels and through an axial transmission shaft substantially parallel to the longitudinal axis of the vehicle, a marine propulsion unit, is characterised in that the engine is so mounted in relation to the transmission to the marine propulsion unit that the bottom of the engine is below the axis of the transmission shaft and wherein the vehicle has a bottom enabling planing in a marine mode.

The invention apart from assisting in ensuring "nose up" provides a conformation which is advantageous for an amphibious vehicle designed to plane.

The bottom of the hull of the vehicle is designed so as to enable the vehicle to plane. To assist this purpose the wheels may be arranged to be stowed in a raised position in marine mode as shown in our co-pending patent application no WO 95/23074.

Preferably the rear wheels are driven by the engine through a differential, a decoupler being provided between the differential and at least one rear wheel. The marine propulsion unit is preferably driven by the engine and road wheel transmission, preferably also through the differential. A further decoupler may be provided between the differential and the marine propulsion unit. The differential is preferably mounted to the rear of the engine.

For an amphibious vehicle according to the invention it is preferable for the centre of gravity to be no greater than 335 mm, and more preferably not more than 275 mm, above the centre of buoyancy so as to ensure an adequate righting moment. When it is designed to plane, the overall planing surface of the hull of the vehicle when planing is preferably between 1.4 and 14 $m^2$, and more preferably between 6 and 7.6 $m^2$. The centre of gravity is preferably not more than 510 mm, and more preferably not more than 450 mm, from the hull bottom.

The metacentric height, beam at vehicle waterline, and waterplane area (where the vehicle is designed to plane) are useful parameters of vehicle stability. It is preferred that the metacentric height is between 370 and 180 mm, and more preferably between 370 mm and 290 mm, depending on vehicle size, load, and configuration. Furthermore, the ratio of metacentric height to the beam at the vehicle waterline should preferably be between 0.10 and 0.33, and more preferably between 0.14 and 0.21. The ratio of metacentric height squared to planing area should preferably be between 0.004 and 0.052, and more preferably between 0.007 and 0.021; all of these ratios depending on vehicle size, load and configuration and where appropriate, whether the vehicle is in displacement mode or planing mode.

Embodiments of the invention will now be described with reference to the accompanying drawings in which:

BRIEF DESCRIPTION OF THE DRAWINGS

FIG. 7 is a similar view to FIG. 6, showing a transverse cross-section of the vehicle;

FIG. 8 is a further, simplified transverse cross-sectional view; and

FIG. 9 is an external view similar to FIG. 4, showing the vehicle in displacement mode, and wish wheels lowered.

These three figures are self explanatory, except for the dimension X, which is the beam dimension averaged along die length of the vehicle. Clearly, the beam dimension will be smaller at the wheel arch cutouts than where the hull is full width.

Figure 10:
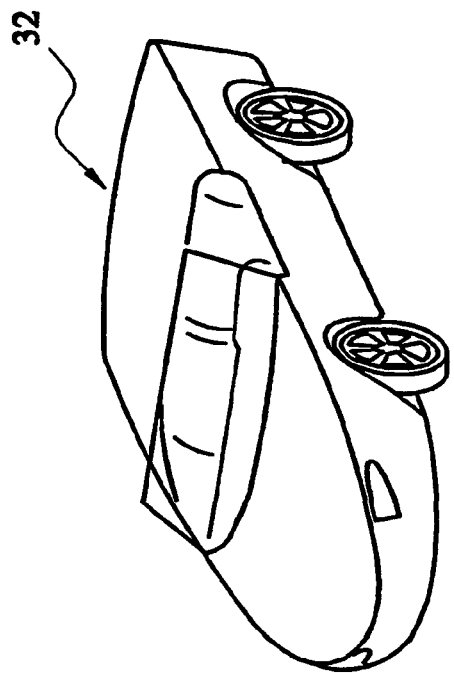
Figure 10:
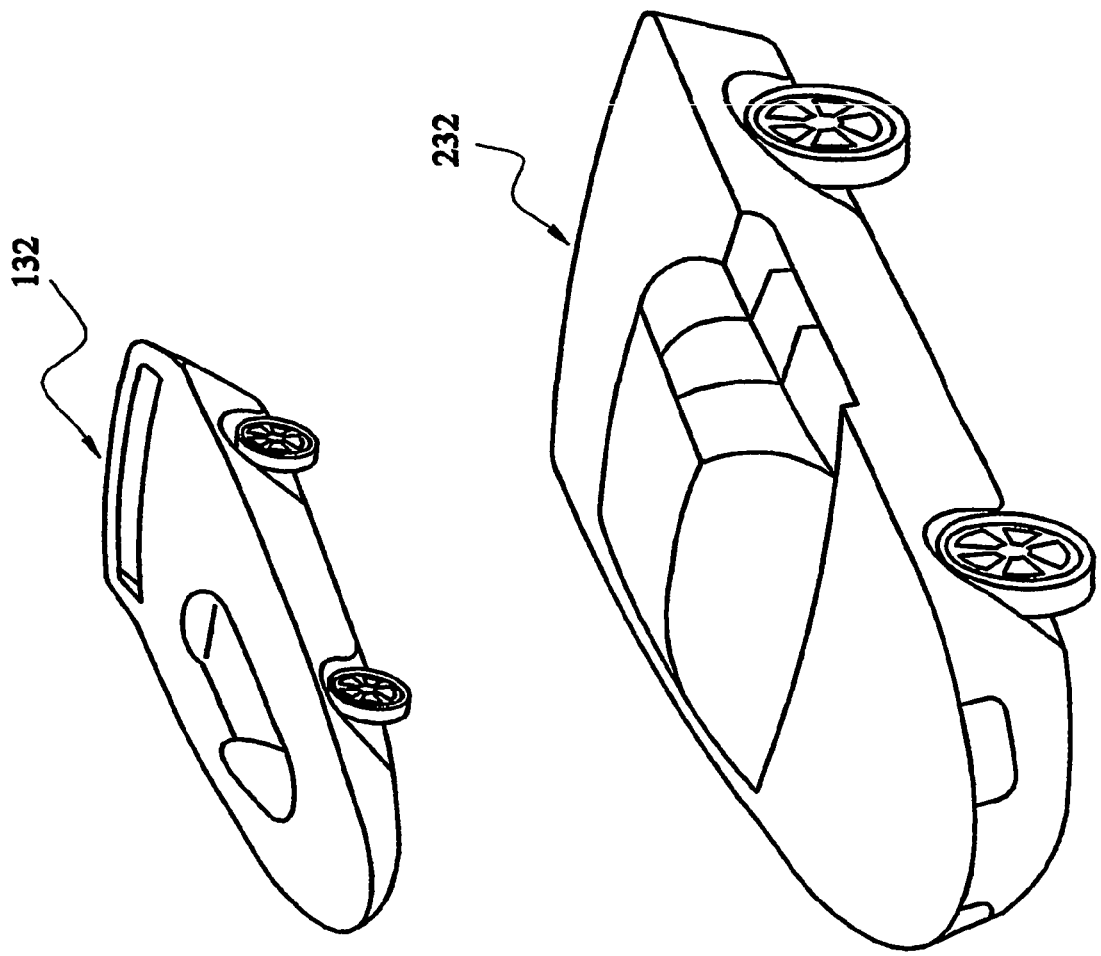

FIG. 10 shows the smallest (132), typical (32), and largest (232) sizes of amphibious vehicle considered practical according to the conformation as claimed.

DETAILED DESCRIPTION OF THE INVENTION

Figure 1:
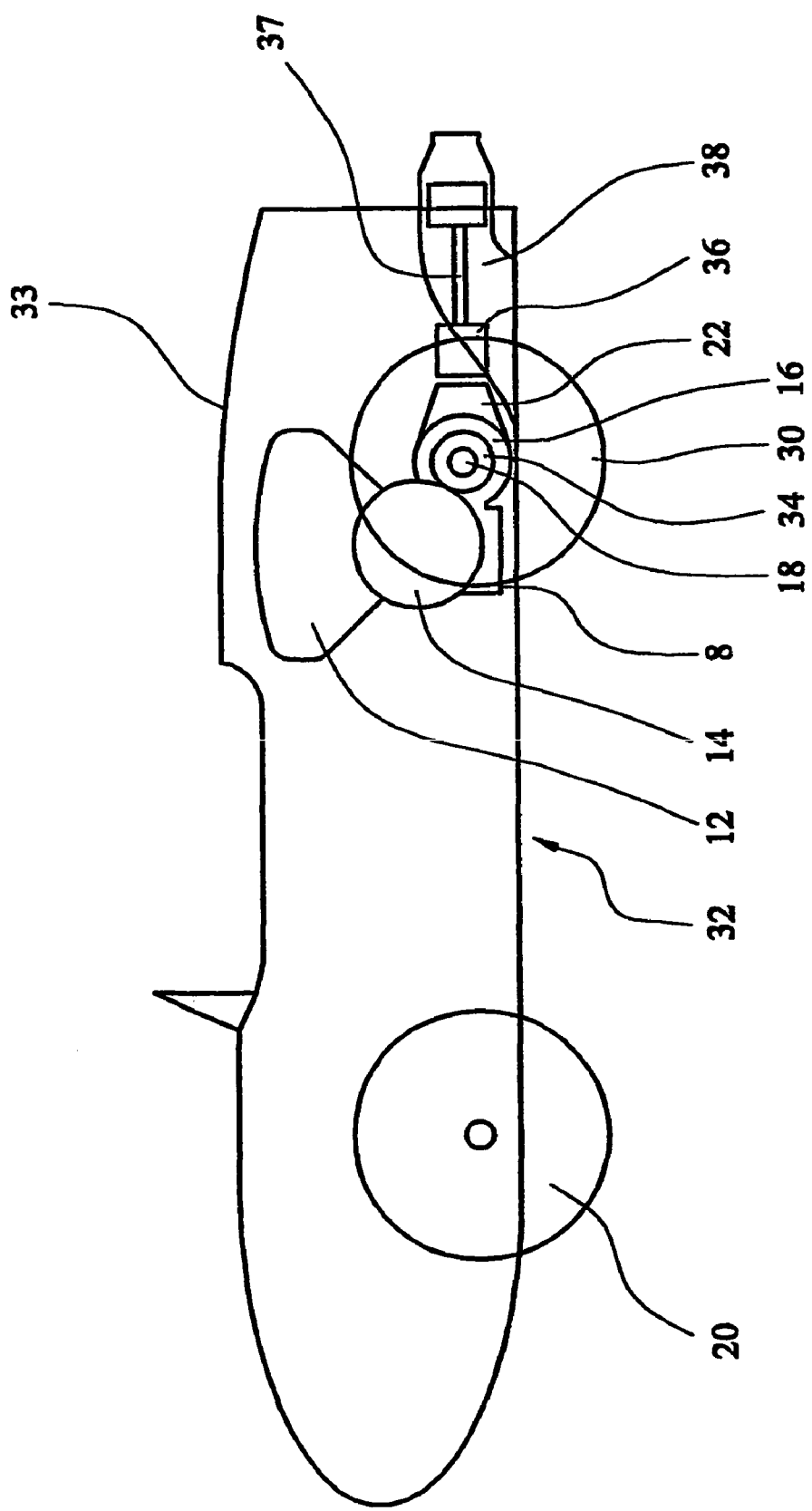
FIG. 1 is a diagrammatic side view of a first embodiment of the invention.
Figure 2:
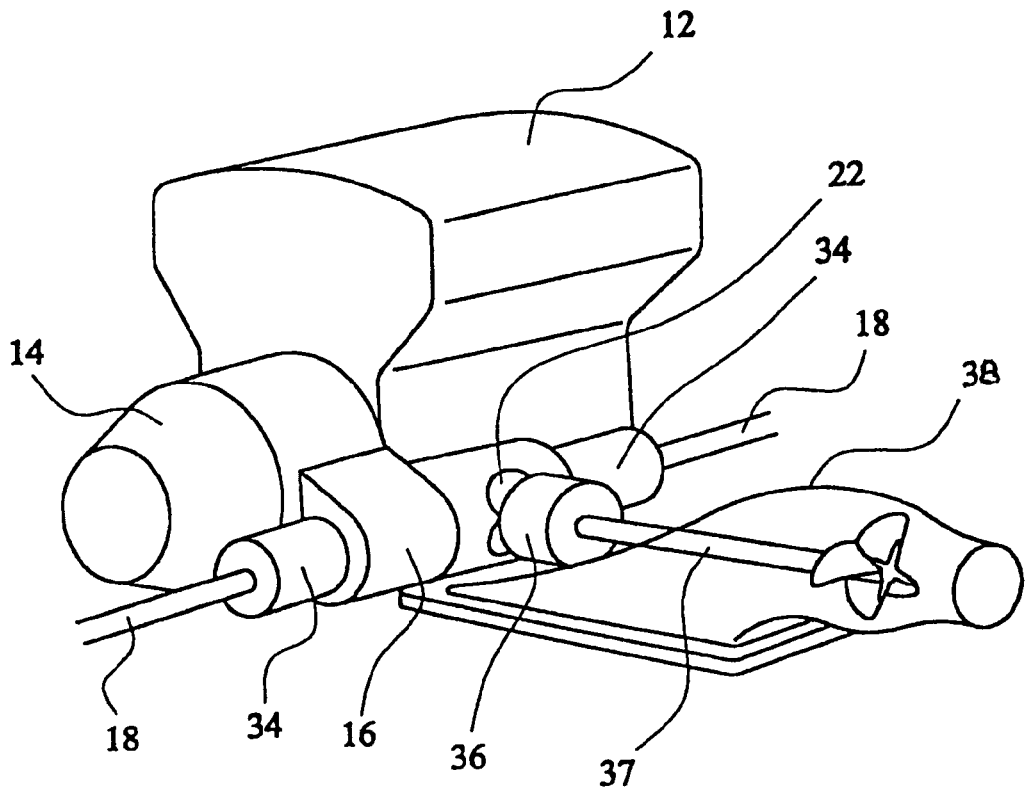
FIG. 2 is a perspective view from the rear and to one side of the powertrain of the first embodiment.
Figure 3:
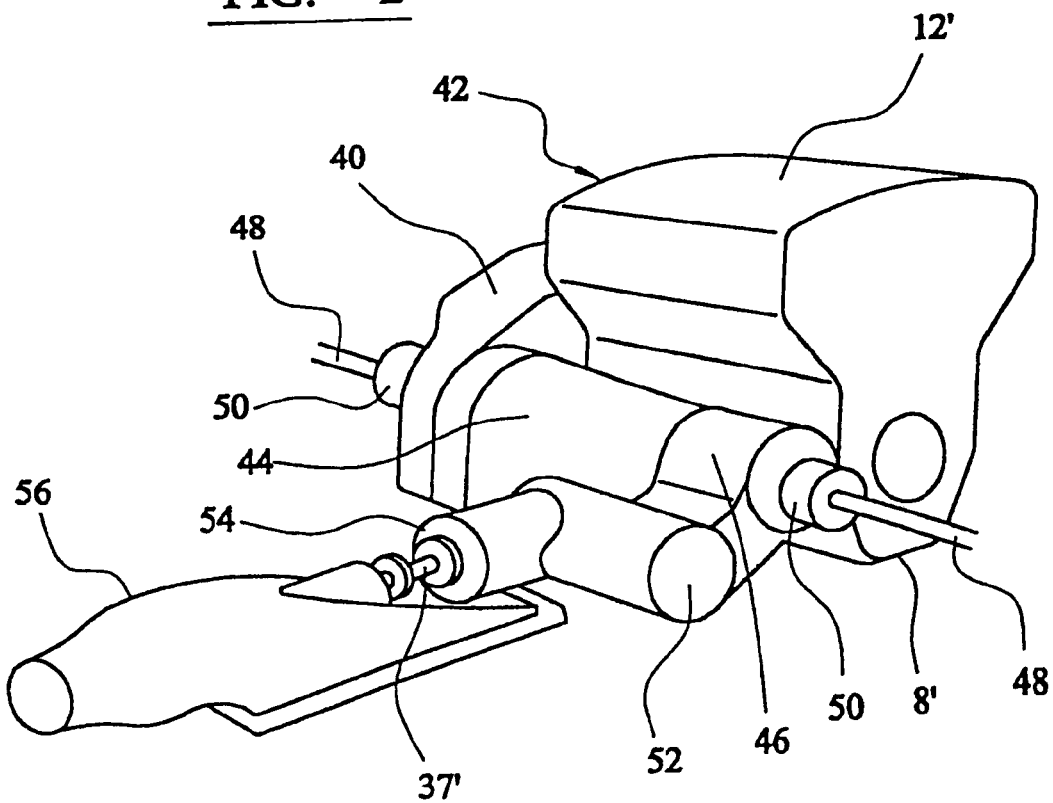
FIG. 3 is a perspective view of an alternative powertrain to that shown in FIG. 2 for a second embodiment of the invention.

FIG. 1, showing the first embodiment, shows a transverse engine 12 positioned towards the rear 33 of a planing amphibious vehicle 32. The engine 12, which drives through an in-line transmission 14, is arranged to drive either rear wheels 30 or marine propulsion unit (in this case a pump jet) 38 or both via differential 16 and decouplers 34 for the rear wheels (one decoupler may suffice) and shafts . The marine propulsion unit 38 is arranged to be driven via transfer gearbox 22 powered from differential 16, a further decoupler 36 and shaft 37 (FIG. 2). Although a pump jet is shown a conventional marine screw propeller may be used. In a second embodiment shown in FIG. 3, a transverse engine 12' is mounted at the rear of a vehicle similar to that in FIG. 1. A transfer drive 40 mounted at one end 42 of the engine 12' provides drive to a transmission 44 positioned parallel with and adjacent to the engine 12'. This arrangement is commonly known as a "wrap around transmission". Transmission 44 is connected to an in-line differential 46.

Driveshafts 48 which provide drive to the rear wheels (not shown), similar to the arrangement of wheels 30 in FIG. 1, are connected to decoupler(s) 50 driven from either side of the differential 46. A transfer gearbox 52 driven from differential 46 provides drive to a decoupler 54 which drives a pump jet 56 via shaft 37'.

Figure 4:
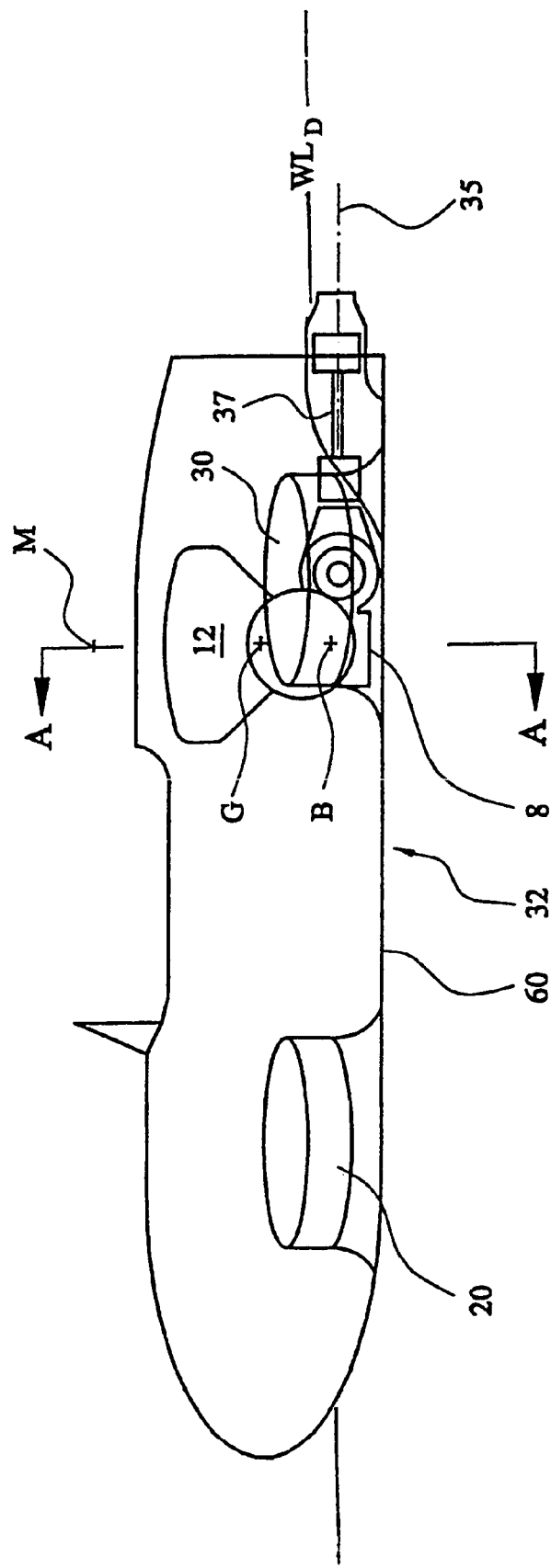
FIG. 4 is a side view of tile first embodiment to show the centre of gravity relative the centre of buoyancy with an average loading, with the vehicle in displacement mode and wheels stowed in marine mode.
Figure 6:
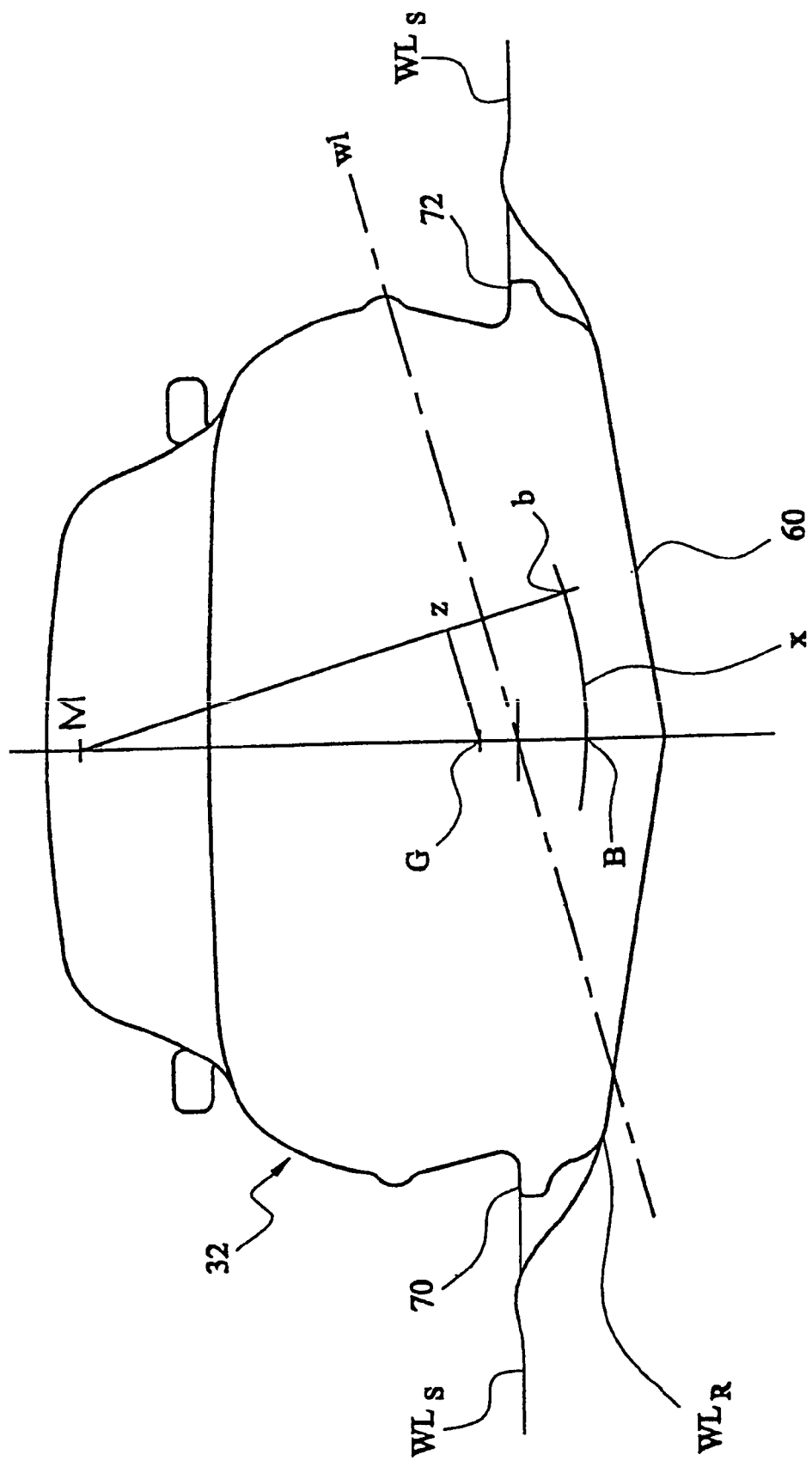
FIG. 6 is a cross section of the vehicle of FIG. 4 taken at A-A of FIG. 4 showing the buoyancy curve at the same average loading, wherein internal details are omitted for clarity.

FIGS. 4 and 6 show the relationship between centre of buoyancy B and centre of gravity G. As the vehicle 32 in its marine mode heels so that waterline $WL_D$ ($WL_S$ in FIG. 6) becomes water wl, the centre of buoyancy moves along buoyancy curve x to centre of buoyancy b. The buoyancy curve x is centered on metacentre M. As the centre of buoyancy shifts from B to b, a righting moment develops, so that at b a righting moment equivalent to dimension GZ applies to right the vehicle. It will therefore be appreciated that the higher G is in relation to B; or as dimension BG increases; GZ will decrease. Thus by ensuring the bottom 8 of the engine 12 (12') is below the axis 35 of axial transmission shaft 37 (37'), in the present embodiment BG should be no greater than 275 mm under normal loading conditions of a full tank of fuel, a driver and one passenger.

FIG. 4 also shows wheels 20, 30 raised in marine mode; which assists planing, as the wheels do not drag in the water. Note that due to the rearward weight bias, waterline $WL_D$ (waterline in displacement mode) is not parallel to the vehicle wheelbase; so the vehicle sits "nose up" even when static.

Figure 5:
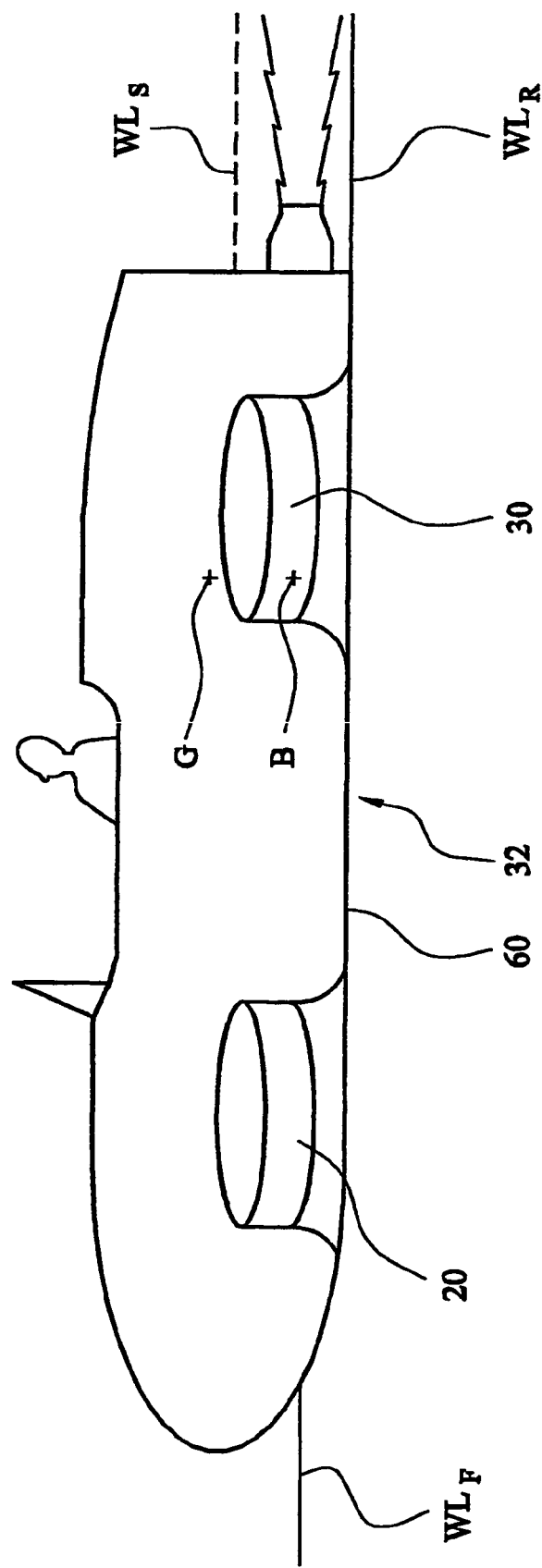
FIG. 5 is a side view similar to FIG. 4, showing the vehicle planing.

FIG. 5 shows the vehicle planing. $WL_F$ represents the water line at the front of the vehicle. Note that when planing, the vehicle sits on the water, rather than in it. $WL_R$ represents the water level at the rear of the vehicle; as can be seen clearly in FIG. 6, a planing vehicle creates a trough in the water by its passage. $WL_S$ is the water level in the surrounding water, to the rear of the vehicle.

Figure 7:
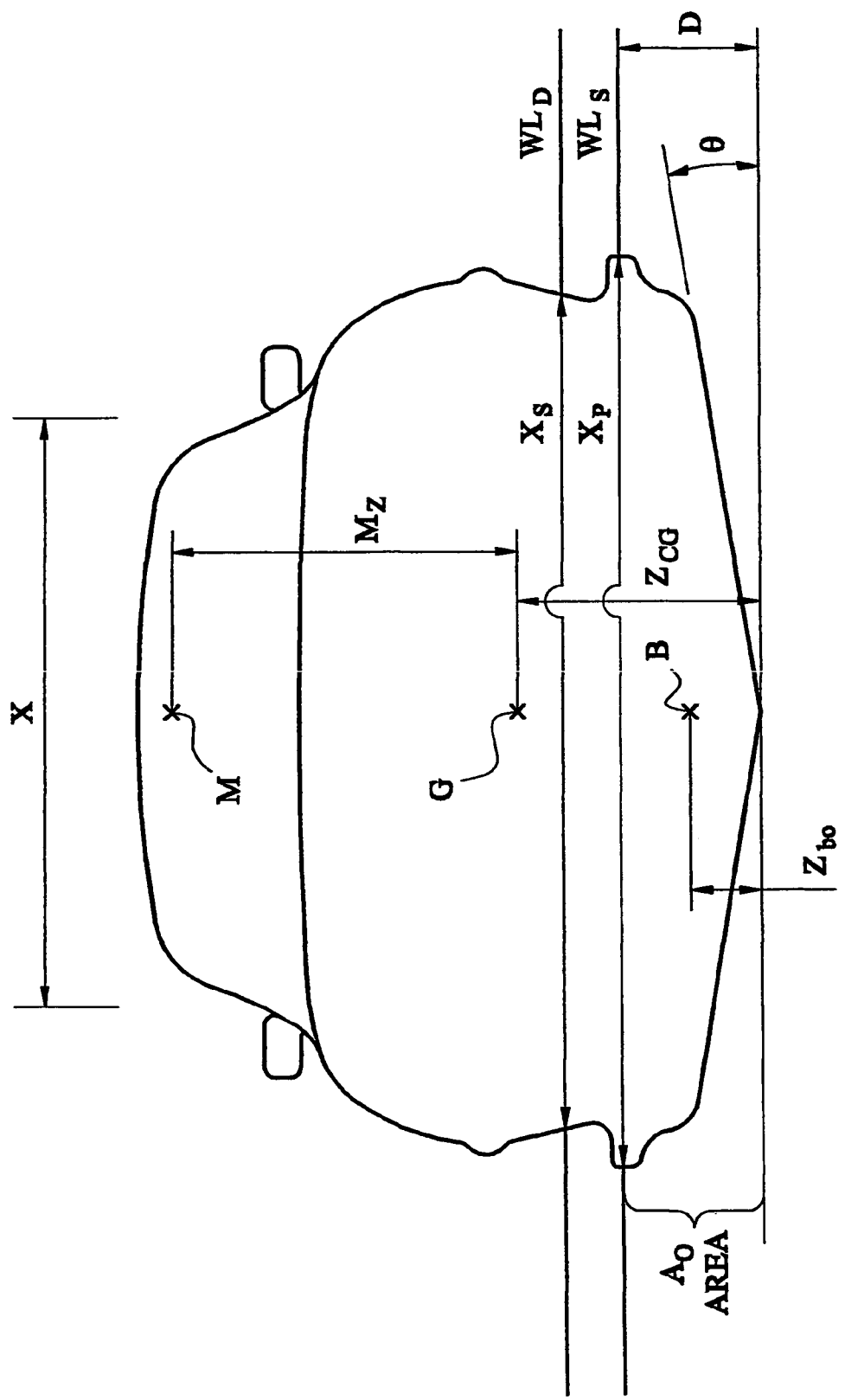
FIGS. 7 to 9 are diagrams illustrating the dimensions listed in the data table on page 6 of the description.
Figure 8:
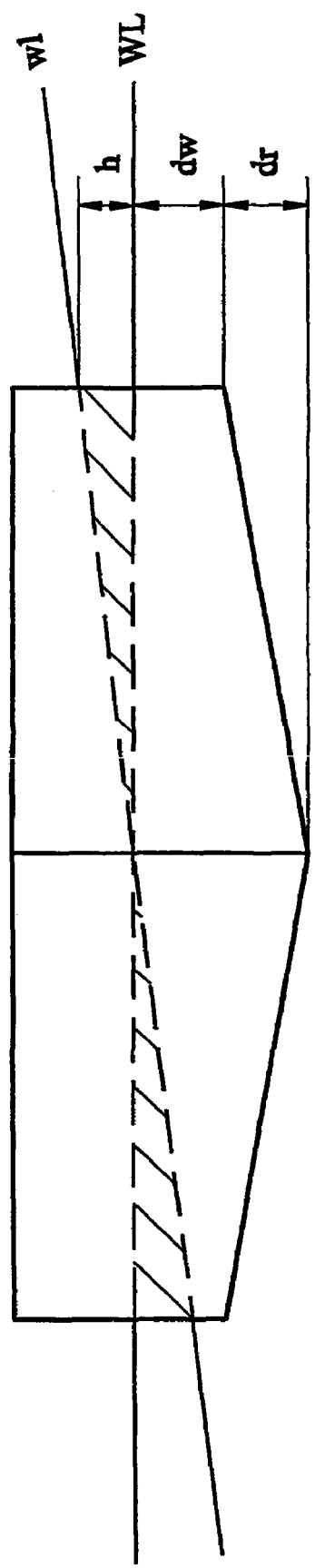
Figure 9:
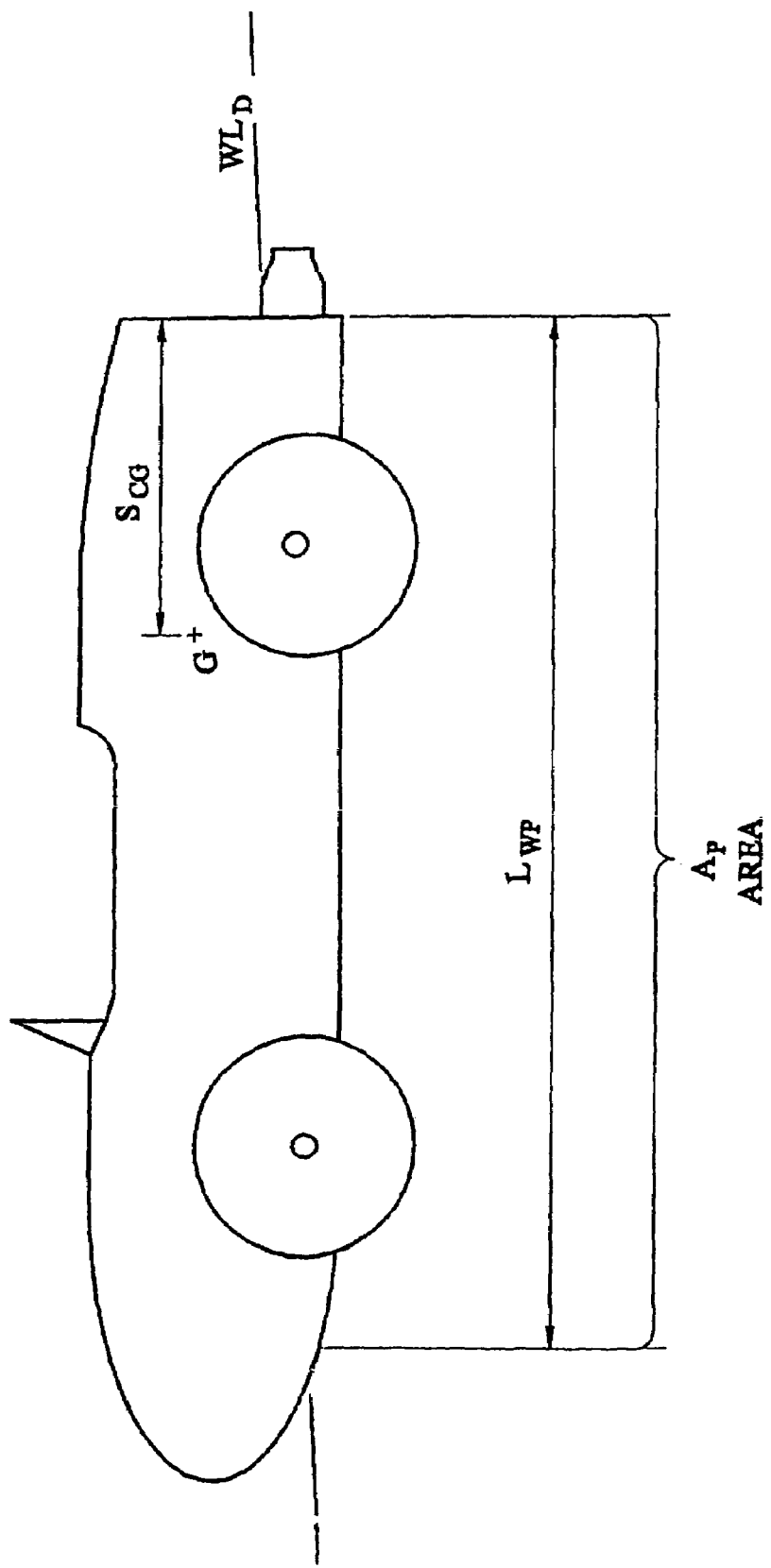

In FIG. 6, it can be seen why the beam at the waterline is wider when planing than it is in displacement mode. Each side of the vehicle has a step 70, 72 between front and rear wheel arches, which is provided to ease entry into the vehicle on land in the same fashion as side steps on four-wheel-drive vehicles. These steps are submerged in displacement mode, when the vehicle is simply floating (FIG. 7). When the vehicle is planing, although there is a gradation in conditions between front and rear of the vehicle, these steps are on the water line in the centre part of the vehicle.

In practice the parameters following apply, for the vehicle shown in FIG. 1:

|  | STATIC | ON PLANE |
| --- | --- | --- |
| Length of Waterline | 4.47 m | 3.4 m |
| Beam of Waterline | 1.85 m | 2.0 m |
| Waterplane Area, nominal ($A_p$) | 8.3 m² | 6.8 m² |

By having shaft 37 (37') above the bottom 8 of the engine, the engine can be lower. This improves the drive angle to the rear wheels and the following improvements result:

(i) improved road handling—less roll and better grip when cornering (ii) improved marine handling when planing (iii) improved marine stability when in displacement mode (iv) less tendency to heel when turning in marine mode (v) in plane mode better lateral stability without having to increase beam (noting that increasing the beam can increase drag at high speed, ride hardness at high speed and roll in a seaway all when planing)

(vi) in displacement mode, better lateral stability without increase in beam; which would increase vessel cost, and reduce the roll angle at which freeboard is exceeded and swamping occurs; and could exceed a practical width for the automotive road-going mode, Further detailed parameters apply for the same embodiment but with different loading conditions as follows (noting that the centre of gravity rises by about 33 mm when wheels are raised in planing mode; and that the centre of buoyancy is at the same longitudinal and lateral location as the centre of gravity.):

| Loading Condition | Case 1: unloaded | Case 2: driver + Fuel + 2 Passengers + Luggage |
| --- | --- | --- |
| Mean beam - mm (X) | 1326 | 1332 |
| Beam at waterline, static - mm ($X_s$) | 1830 | 1850 |
| Beam at waterline, planing - mm ($X_p$) | N/A | 2000 |
| Deadrise - degrees (θ) | 9 | 9 |
| C of G above hull bottom - mm ($Z_{cg}$) | 401 | 395 |
| C of G from stern - mm ($S_{cg}$) | 1680 | 1680 |
| Draft - mm (D) | 301 | 330 |
| Water plane length, static - mm ($L_{wp}$) | 4400 | 4470 |
| Small immersion due to tilt - mm (h) | 50.0 | 50.2 |

-continued

| Loading Condition | Case 1: unloaded | Case 2: driver + Fuel + 2 Passengers + Luggage |
|---|---|---|
| Depth of deadrise - mm (dr) | 105.0 | 105.5 |
| Wall immersion level-mm (dw) | 196.0 | 224.5 |
| Mean cross section area immersed - mm$^2$ ($A_o$) | 329510 | 369313 |
| Centre of buoyancy height - mm ($Z_{bo}$) | 174.9 | 189.7 |
| Moments about hull base - m$^3$ ($A_o Z_{bo}$) | 0.0576 | 0.0701 |
| Metacentric height - mm ($M_z$) | 363.5 | 328.0 |
| Centre of buoyancy to metacentre (BM) | 589.6 | 533.3 |
| Ratio of metacentric height to waterline beam, static ($M_z / X_s$) | 0.199 | 0.178 |
| Ratio of metacentric height to waterline beam, planning ($M_z / X_p$) | N/A | 0.164 |
| Ratio of (metacentric height) squared to planning area ($M_z^2 / A_p$) | N/A | 0.0158 |

From these parameters, it can be seen that for this embodiment, the centre of gravity is not more than 450 mm from the vehicle hull bottom. Further, the metacentric height is within the range from 370 mm to 290 mm, dependent on vehicle load and configuration.

The ratio of metacentric height to beam at the vehicle waterline is readily calculated from the above data, and is found to be between 0.14 and 0.21, dependent on vehicle load and for a planing vehicle with retractable wheels, on vehicle configuration, and whether it is in displacement mode or in planing mode. This ratio is a useful indicator of lateral stability on water, where a high ratio indicates high stability. For comparison, K. J. Rawson and E. C. Tupper, in "Basic Ship Theory" Volume 1, Section 4, give a typical value for a ship of 0.143. In the present case, is amphibious vehicle has an improved stability over the slip described by Rawson and Tupper.

The ratio of metacentric height squared to waterplane area is particularly helpful for a planing vehicle, as an indication of stability in both lateral and longitudinal axes. This ratio is readily calculated from the above data, and is found to be between 0.009 and 0.021, with identical provisos to the above; in that this ratio depends on vehicle load and for a planing vehicle with retractable wheels, on vehicle configuration, and whether it is in displacement mode or in planing mode.

The above parameters are as mentioned above, calculated for an amphibious vehicle 32 according to FIG. 1 which is also shown as a typical amphibious vehicle according to the claims, in FIG. 10. The smallest amphibious vehicle considered practical according to the conformation as claimed is shown at 132 in FIG. 10. It is considered that its centre of gravity would be approximately 60 mm higher than for vehicle 32, and its planing area 1.4-3 m$^2$, dependent on hull design. Its metacentre would be some 50 mm lower than for vehicle 32, and its static beam at the waterline 1.2 m. The planing beam at the waterline would be 0.9 m.

From these parameters, the centre of gravity for such a vehicle would not be greater than 335 mm above the centre of buoyancy, and not more than 510 mm from the bull bottom. The metacentric height will vary between 260 mm and 180 mm; and its ratio to beam at waterline will vary between 0.14 and 0.33. The ratio of metacentric height squared, to planing area will vary from 0.011 to 0.052.

Similarly, the largest amphibious vehicle considered practical according to the conformation as claimed is shown at 232 in FIG. 10. Its centre of gravity would be 40 mm higher than for vehicle 32, and its planing area 10-14 m$^2$. Its metacentre would be at the same height as for vehicle 32. The static beam at the waterline would be 2.3 m, and the planing beam at the waterline 2.4 m.

From these parameters the centre of gravity for such a vehicle would not be greater than 315 mm above the centre of buoyancy, and not more than 490 mm from the hull bottom. The metacentric height will vary between 330 mm and 250 mm; and its ratio to beam at waterline will vary between 0.10 and 0.14. The ratio of metacentric height squared, to planing area will vary from 0.004 to 0.109.

The invention claimed is:

1. An amphibious vehicle having road wheels and a transverse engine mounted in the middle or rear of the vehicle and having a crankshaft extending transversely of the vehicle, the engine arranged to drive rear road wheels and through an axial transmission shaft substantially parallel to the longitudinal axis of the vehicle, a marine propulsion unit, characterised in that the engine is so mounted in relation to the transmission to the marine propulsion unit that the bottom of the engine is below the axis of the transmission shaft and wherein the vehicle has a bottom enabling planing in a marine mode, said road wheels arranged to be stowed in a raised position to allow for planing during marine travel, wherein in the raised position, the road wheels are angularly displaced in relation to the longitudinal axis of the vehicle relative to their position for land travel wherein the engine is arranged only to drive the rear wheels and the propulsion unit;

wherein in the marine mode, the vehicle sits nose up in the water.

2. The vehicle of claim 1 wherein the axes around which the road wheels rotate for raising and lowering are substantially parallel to the longitudinal axis of the vehicle.

3. The vehicle of claim 1 wherein the rear wheels are driven by the engine through a differential, a decoupler being provided between a differential and at least one rear wheel.

4. The vehicle of claim 1 wherein the marine propulsion unit is arranged to be driven from the engine and road wheel transmission.

5. The vehicle of claim 1 wherein the marine propulsion unit is arranged to be driven from the engine, road wheel transmission, and a differential.

6. The vehicle of claim 1 wherein the marine propulsion unit is arranged to be driven from the engine, road wheel transmission, and a differential, via a further decoupler.

7. The vehicle of claim 1 wherein a differential is mounted to the rear of the engine.

8. The vehicle of claim 1 having a centre of gravity no greater than 335 mm above a centre of buoyancy.

9. The vehicle of claim 1 having a centre of gravity no greater than 275 mm above the centre of buoyancy.

10. The vehicle of claim 1 wherein the bottom has a planing surface between 1.4 and 14 m$^2$.

11. The vehicle of claim 1 wherein the bottom has a planing surface between 6 and 7.6 m$^2$.

12. The vehicle of claim 1 having a centre of gravity of the vehicle not more than 510 mm above the vehicle hull bottom.

13. The vehicle of claim 1 having a centre of gravity of the vehicle not more than 450 mm above the vehicle hull bottom.

14. The vehicle of claim 1 having a metacentric height between 370 and 180 mm, dependent on vehicle size, load, and configuration.

15. The vehicle of claim 1 having a metacentric height between 370 and 290 mm, dependent on vehicle load and configuration.

16. The vehicle of claim 1 having a ratio of metacentric height to beam at the vehicle waterline between 0.10 and 0.33, dependent on vehicle size, load, and configuration, and whether the vehicle is in displacement mode or in planing mode.

17. The vehicle of claim 1 having a ratio of metacentric height to beam at the vehicle waterline between 0.14 and 0.21, dependent on vehicle load and configuration, and whether the vehicle is in displacement mode or in planing mode.

18. The vehicle of claim 1 having a ratio of metacentric height squared to waterplane area between 0.004 and 0.052, dependent on vehicle size, load, and configuration, and whether the vehicle is in displacement mode or in planing mode.

19. The vehicle of claim 1 having a ratio of metacentric height squared to waterplane area is between 0.007 and 0.021, dependent on vehicle size, load, and configuration, and whether the vehicle is in displacement mode or in planing mode.

20. The vehicle of claim 1 wherein the road wheels do not drag in the water when in the raised position.

21. The vehicle of claim 1 wherein the centre of gravity of the vehicle is the same with the wheels in the raised position as with the wheel in the lowered position.

22. The vehicle of claim 1 wherein the vehicle sits nose up in a static position in the marine mode.

23. The vehicle of claim 1 wherein the vehicle sits nose up in a static position in the marine mode, such that the waterline of the vehicle in a displacement mode is not parallel to a vehicle wheel base.

24. The vehicle of claim 1 wherein the vehicle sits nose up when planing.

25. An amphibious vehicle having road wheels and a transverse engine having a crankshaft extending transversely of the vehicle, the engine arranged to drive rear road wheels and through an axial transmission shaft substantially parallel to the longitudinal axis of the vehicle, a marine propulsion unit;
wherein said road wheels rotate inward in relation to the longitudinal axis of the vehicle when moved to a stowed position to enable planing in the marine mode;
further wherein the vehicle sits nose up in a static position in a marine mode, such that the waterline of the vehicle in a displacement mode is not parallel to a vehicle wheel base.

26. An amphibious vehicle having road wheels and a transverse engine mounted in the middle or rear of the vehicle and having a crankshaft extending transversely of the vehicle, the engine arranged to drive rear road wheels and through an axial transmission shaft substantially parallel to the longitudinal axis of the vehicle, a marine propulsion unit, characterised in that the engine is so mounted in relation to the transmission to the marine propulsion unit that the bottom of the engine is below the axis of the transmission shaft and wherein the vehicle has a bottom enabling planing in a marine mode, said road wheels arranged to be stowed in a raised position to allow for planning during marine travel, wherein said road wheels are rotated inward in relation to the longitudinal axis of the vehicle when moved to said raised position wherein the engine is arranged only to drive the rear wheels and the propulsion unit.

27. An amphibious vehicle having road wheels, a transverse engine having a crankshaft extending transversely of the vehicle, and a wrap around transmission, the engine arranged to drive rear road wheels and through an axial transmission shaft substantially parallel to the longitudinal axis of the vehicle, a marine propulsion unit;
wherein said road wheels rotate inward toward the longitudinal axis of the vehicle when moved to a stowed position to enable planing in the marine mode;
further wherein the vehicle sits nose up in a static position in a marine mode, such that the waterline of the vehicle in a displacement mode is not parallel to a vehicle wheel base.

28. An amphibious vehicle having road wheels and a transverse engine mounted in the middle or rear of the vehicle and having a crankshaft extending transversely of the vehicle, the engine arranged to drive rear road wheels through a speed change gearbox and through rear wheel drive shafts and through an axial transmission shaft substantially parallel to the longitudinal axis of the vehicle, a marine propulsion unit, characterised in that the engine is so mounted in relation to the transmission to the marine propulsion unit that the bottom of the engine is below the axis of the transmission shaft and wherein the vehicle has a bottom enabling planing in a marine mode, said road wheels arranged to be stowed in a raised position to allow for planing during marine travel, wherein in the raised position, the road wheels are angularly displaced in relation to the longitudinal axis of the vehicle relative to their position for land travel wherein the engine is arranged only to drive the rear wheels and the propulsion unit;
wherein the rear drive shafts are to the rear of the engine and gearbox;
further wherein in the marine mode, the vehicle sits nose up in the water.

29. An amphibious vehicle having road wheels and a transverse engine mounted in the middle or rear of the vehicle and having a crankshaft extending transversely of the vehicle, the engine arranged to drive rear road wheels through a speed change gearbox and through rear wheel drive shafts and through an axial transmission shaft substantially parallel to the longitudinal axis of the vehicle, a marine propulsion unit, characterised in that the engine is so mounted in relation to the transmission to the marine propulsion unit that the bottom of the engine is below the axis of the transmission shaft and wherein the vehicle has a bottom enabling planing in a marine mode, said road wheels arranged to be stowed in a raised position to allow for planing during marine travel, wherein in the raised position, the road wheels are angularly displaced in relation to the longitudinal axis of the vehicle relative to their position for land travel wherein the engine is arranged only to drive the rear wheels and the propulsion unit;
wherein the rear drive shafts are to the rear of the crankshaft;
further wherein in the marine mode, the vehicle sits nose up in the water.

* * * * *